(12) United States Patent
Zhang et al.

(10) Patent No.: US 8,553,608 B2
(45) Date of Patent: Oct. 8, 2013

(54) BANDWIDTH REQUEST METHOD AND RELAY STATION

(75) Inventors: Liangliang Zhang, Shenzhen (CN); Yanling Lu, Shenzhen (CN); Ting Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 489 days.

(21) Appl. No.: 12/647,092

(22) Filed: Dec. 24, 2009

(65) Prior Publication Data

US 2010/0110974 A1  May 6, 2010

Related U.S. Application Data

(63) Continuation of application No. PCT/CN2008/071425, filed on Jun. 24, 2008.

(30) Foreign Application Priority Data

Jul. 2, 2007  (CN) .......................... 2007 1 0122737

(51) Int. Cl.
*H04B 7/14* (2006.01)

(52) U.S. Cl.
USPC ........................................................ 370/315

(58) Field of Classification Search
USPC ........................................................ 370/315
See application file for complete search history.

(56) References Cited

U.S. PATENT DOCUMENTS

| | | | | |
|---|---|---|---|---|
| 7,646,752 | B1 * | 1/2010 | Periyalwar et al. | 370/338 |
| 2002/0122395 | A1 * | 9/2002 | Bourlas et al. | 370/329 |
| 2005/0047364 | A1 * | 3/2005 | Matsukura et al. | 370/328 |
| 2005/0232231 | A1 | 10/2005 | Miyabe | |
| 2006/0264172 | A1 * | 11/2006 | Izumikawa et al. | 455/11.1 |
| 2007/0081507 | A1 * | 4/2007 | Koo et al. | 370/338 |
| 2008/0031182 | A1 | 2/2008 | Maheshwari et al. | |

FOREIGN PATENT DOCUMENTS

| CN | 1201311 A | 12/1998 |
|---|---|---|
| CN | 1941666 A | 4/2007 |
| CN | 101155395 A | 4/2008 |

OTHER PUBLICATIONS $1^{st}$ Office Action in corresponding Chinese Patent Application No. 200880000883.9 (May 25, 2012).
International Search Report in corresponding International Patent Application No. PCT/CN2008/071425 (Oct. 9, 2008).
Written Opinion of the International Searching Authority in corresponding International Patent Application No. PCT/CN2008/071425 (Oct. 9, 2008).
"802.16j-06/026r4—Part 16: Air Interface for Fixed and Mobile Broadband Wireless Access Systems; Multihop Relay Specification," P802.16j Baseline Document, Jun. 6, 2007, IEEE, Washington, D.C.

* cited by examiner

*Primary Examiner* — Ayaz Sheikh
*Assistant Examiner* — Hai-Chang Hsiung
(74) *Attorney, Agent, or Firm* — Leydig, Voit & Mayer, Ltd.

(57) ABSTRACT

The present invention provides a bandwidth method and a relay station (RS). After receiving the bandwidth request message sent by subordinate network entity, RS judges whether it has available bandwidth; if it has available bandwidth, sending a bandwidth request message to superordinate network entity based on the available bandwidth; otherwise, requesting bandwidth from superordinate network entity using CDMA ranging codes.

12 Claims, 11 Drawing Sheets

BANDWIDTH REQUEST METHOD AND RELAY STATION

CROSS-REFERENCE TO RELATED APPLICATIONS

This application is a continuation of International Application No. PCT/CN2008/071425, filed on Jun. 24, 2008, which claims priority to Chinese Patent Application No. 200710122737.0, filed on Jul. 2, 2007, both of which are hereby incorporated by reference in their entireties.

FIELD OF THE INVENTION

The present invention relates to the communication technology field, and in particular to a bandwidth request method and relay station.

BACKGROUND

The broadband wireless access (BWA) has attracted increasing attention as it accelerates the access rate of communication system.

In terms of the fundamentals of radio communications, the higher the radio wave transmission frequency is, the faster the attenuation over a longer communication distance will be. Conventional wireless relay systems rely mostly on centralized scheduling, and the Multihop Relay Base Station (MR_BS) allocates one Code Division Multiple Addressing (CDMA) Ranging Code subset to each Relay Station (RS) in the relay link to reduce overhead on wireless multi-hop networks and delay in each ranging process. A part of the RS CDMA Ranging Code may be used to inform the MR-BS that Mobile Station (MS) need to request bandwidth for forwarding a bandwidth request header to the MR-BS, while the other part may be used to inform MR-BS that RS need to request bandwidth for forwarding a bandwidth request header to MR-BS. RS forwards the bandwidth request of MS to MR_BS in the relay uplink. After receiving CDMA ranging code which is used for the bandwidth request, MR_BS allocates uplink bandwidth to the corresponding access link and relay link so that the MS can send a bandwidth request header to MR_BS.

In the multi-hop network with RSs, the MS sends the CDMA ranging code to its severing RS, to request bandwidth allocation used for sending the bandwidth request header. After receiving the CDMA ranging code from MS, RS sends on its own uplink the CDMA ranging code of RS corresponding to the CDMA ranging code from MS. If several RSs are available, each RS sends the CDMA ranging code, on its own uplink, to request bandwidth allocation till the CDMA ranging code of bandwidth request is sent to MR_BS. After receiving the CDMA ranging code, MR_BS allocates uplink bandwidth to RS and requires the RS to send the MR_Code_REP message to MR_BS. RS sends the MR_Code_REP message to inform MR_BS that an MS within its coverage requests for sending a bandwidth request header to MR_BS. The MR_Code_REP message includes the CDMA ranging code from MS. MR_BS may use the related information contained in MR_Code_REP message to allocate the uplink bandwidth to MS and requires the MS to send a bandwidth request header.

In the conventional system, the Orthogonal Frequency Division Multiplexing (OFDM) physical layer uses the Raphael pseudo noise sequence code ranging code, i.e. CDMA ranging code.

Up to 256 ranging codes are available and it ranges from 0 to 255. Each MR_BS uses one subset of these codes, wherein the subset is defined by S, $0<=S<=255$. The codes in the subset are made up of codes between S and $((S+O+N+M+L) \bmod 256)$. Wherein, the first N codes are used for initial ranging, the following M codes are used for periodic ranging; the latter L codes are used for bandwidth request, and the following O codes are used for switching ranging.

MS sends the CDMA ranging code to MR_BS. When MR_BS detects the CDMA ranging code, it will allocate uplink bandwidth to MS through broadcast message(s) and the CDMA-allocation-IE in such broadcast message indicates the transmission area and the CDMA ranging code sent by MS. Then, through parameters such as the CDMA ranging code in this message, MS confirms that the bandwidth in this message is allocated to it. Therefore, MS can use the allocated bandwidth to send bandwidth requests or data. MR_BS may receive several CDMA codes at the same time.

Figure 1A:
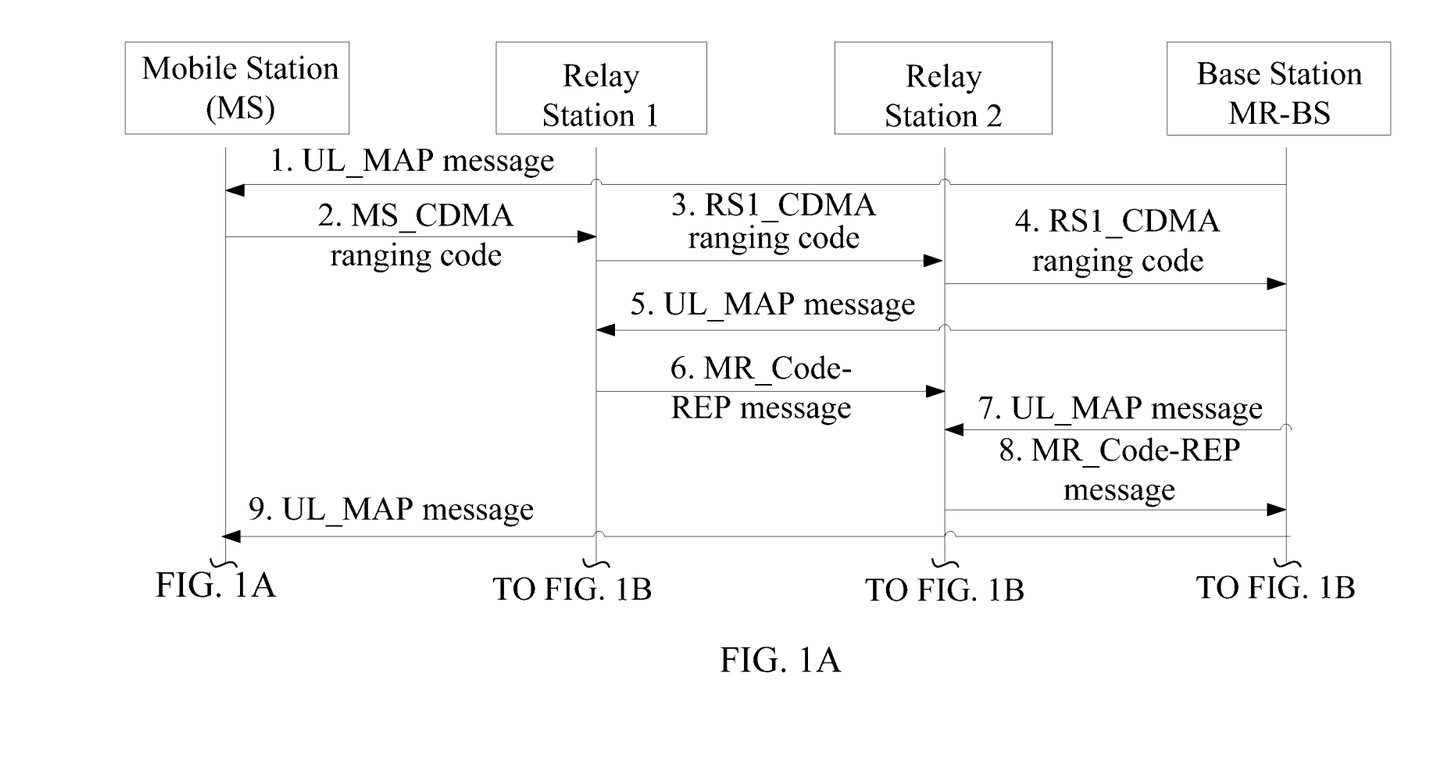
FIGS. 1A-1B shows a flowchart of bandwidth request and service sending in the conventional technology.
Figure 1B:
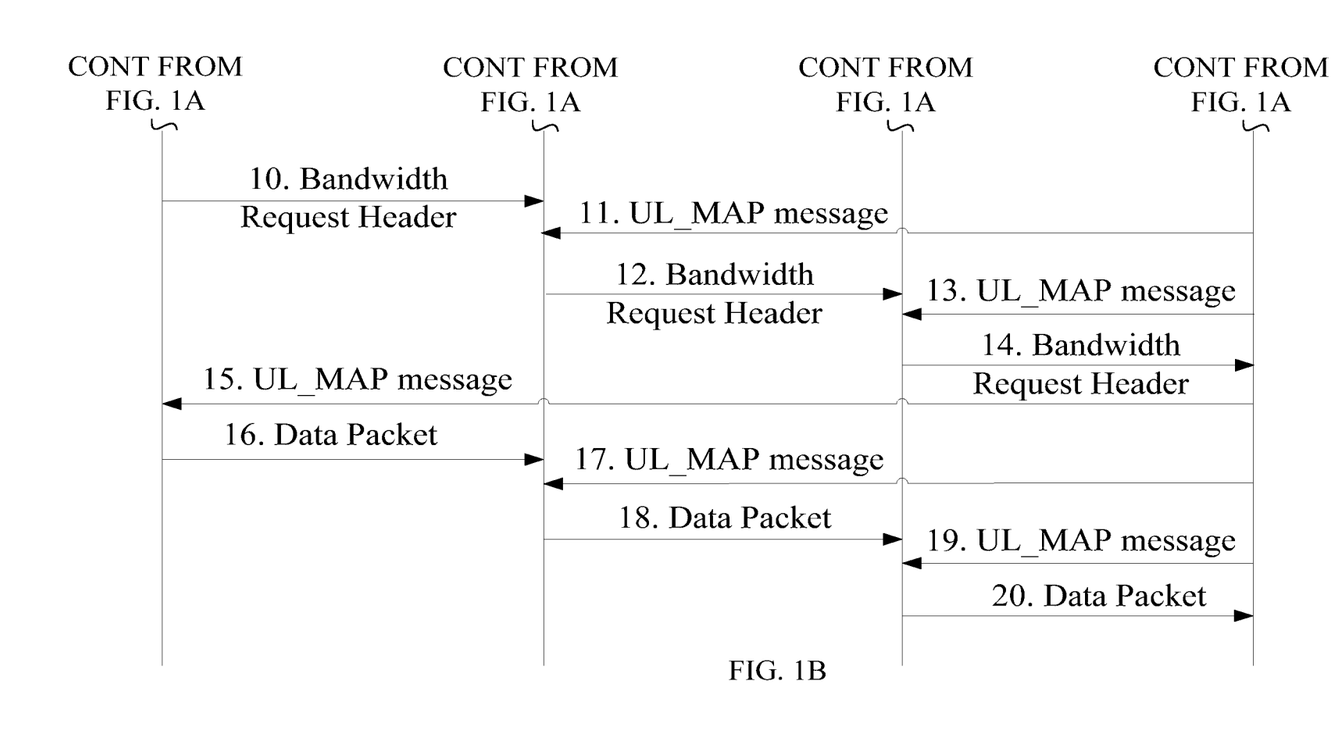

FIG. 1 shows the process where the MS requests bandwidth for sending data packets via CDMA ranging codes in a wireless relay system including two RSs, such as RS1 and RS2. MR_BS sends a UL_MAP message to MS, RS1, and RS2 through broadcast. The UL_MAP message mainly defines uplink parameters. MR_BS allocates bandwidth which is defined by IE in UL_MAP to MS and RS for sending uplink data and messages. Each frame has a UL_MAP. The specific signaling flows are as follows:

Step 1: MR_BS broadcasts the UL_MAP message to MS, RS1, and RS2. FIG. 1 shows that MS receives the UL_MAP message sent by MR_BS through broadcast. Actually, MS may receive the UL_MAP message directly from MR_BS, or receive the UL_MAP message forwarded by relay stations. Similarly, the UL_MAP message received by RS1 may be directly sent from MR_BS, or forwarded by RS2.

Step 2: MS sends CDMA ranging code to its severing RS1 for requesting uplink bandwidth, and the CDMA ranging code sent by MS is identified as MS_CDMA ranging code.

Step 3: After receiving the MS_CDMA ranging code, RS1 stores the MS_CDMA ranging code, generates a new CDMA ranging code according to the CDMA ranging code subset which is allocated by MR-BS, and sends the new CDMA ranging code to RS2 to request uplink bandwidth; and the CDMA ranging code sent by RS1 is identified as RS1_CDMA ranging code.

Step 4: After receiving the RS1_CDMA ranging code, RS2 forwards it to MR_BS.

Step 5: After receiving the RS1_CDMA ranging code, MR_BS broadcasts the UL_MAP message which contains the information about allocating uplink bandwidth to RS1. RS1 obtains the uplink bandwidth by parses the information in the UL_MAP message. FIG. 1 shows that RS1 directly receives the UL_MAP message sent by MR_BS through broadcast. Actually, RS1 may also receive the UL_MAP message sent by RS2.

Step 6: RS1 uses the uplink bandwidth allocated by MR_BS to send the MR_Code_REP message carrying with the stored MS_CDMA ranging code information to RS2.

Step 7: After receiving RS1_CDMA ranging code, MR_BS broadcasts the UL_MAP message, which contains the information of allocating the uplink bandwidth to RS2. RS1 obtains the uplink bandwidth by parsing the information in the UL_MAP message.

Step 8: After obtaining the uplink bandwidth, RS2 forwards the MR_Code_REP message to MR_BS.

Step 9: After receiving the MR_Code_REP message, MR_BS reads the content of the message and obtains the MS_CDMA ranging code information. MR_BS allocates corresponding uplink bandwidth to MS. Specifically, MR_BS broadcasts the UL_MAP message, which contains the information about allocating the uplink bandwidth to MS.

FIG. 1 shows that MS directly receives the UL_MAP message from MR_BS through broadcast. Actually, MS may also receive the UL_MAP message forwarded by relay stations.

Step 10: MS sends a bandwidth message header to RS1 by using the uplink bandwidth allocated by MR_BS.

Step 11: MR_BS broadcasts the UL_MAP message, which contains the information about allocating the uplink bandwidth to RS1. FIG. 1 shows that RS1 directly receives the UL_MAP message sent by MR_BS through broadcast. Actually, RS1 may also receive the UL_MAP message forwarded by RS2.

Step 12: RS1 uses the allocated uplink bandwidth to forward the received bandwidth message header to RS2.

Step 13: MR_BS broadcasts the UL_MAP message, which contains the information about allocating the uplink bandwidth to RS2.

Step 14: RS2 uses the allocated uplink bandwidth to forward the received bandwidth message header to MR_BS.

Step 15: After receiving the bandwidth message header, MR_BS broadcasts the UL_MAP message according to the content of the bandwidth message header. The UL_MAP message contains the information about allocating uplink bandwidth to MS. FIG. 1 shows that MS directly receives the UL_MAP message sent by MR_BS through broadcast. Actually, MS may also receive the UL_MAP message forwarded by relay stations.

Step 16: MS uses the uplink bandwidth allocated by MR_BS to send data packets to RS1.

Step 17: MR_BS broadcasts the UL_MAP message, which contains the information about allocating the uplink bandwidth to RS1. FIG. 1 shows that RS1 directly receives the UL_MAP message sent by MR_BS through broadcast. Actually, RS1 may also receive the UL_MAP message forwarded by RS2.

Step 18: RS1 uses the allocated uplink bandwidth to forward data packets to RS2.

Step 19: MR_BS broadcasts the UL_MAP message, which contains the information about allocating the uplink bandwidth to RS2.

Step 20: RS2 uses the allocated uplink bandwidth to forward data packets to MR_BS.

The inventor found that the conventional technology has at least the following problems:

Each RS, after receiving a bandwidth request from the subordinate network entity, uses its own CDMA ranging code to send a bandwidth request to MR_BS, and after obtaining the allocated bandwidth by parsing the corresponding UL_MAP message broadcasted by MR_BS, RS uses this allocated bandwidth to send the bandwidth request which is received from its subordinate network entity. The latency for the bandwidth request procedure of MS may be increased. Especially when the system has a large number of hops, the RS uses Contention-based CDMA ranging codes to request bandwidth, and in order to contend successfully RS may try several times to obtain bandwidth for forwarding the bandwidth request from MS. Therefore, more delay may be induced in the bandwidth request procedure.

SUMMARY

A bandwidth request method and relay station are provided according to an embodiment of the present invention to reduce time delay in the bandwidth request.

A bandwidth request method is provided according to an embodiment of the present invention. The bandwidth request method includes:

judging, by the relay station, whether it has the available bandwidth or not, after it receives the bandwidth request sent by the a subordinate network entity: if it has the available bandwidth, sending the bandwidth request to a superordinate network entity based on the available bandwidth; otherwise, sending a ranging code to the superordinate network entity.

A relay station is provided according to an embodiment of the present invention. The relay station includes a receiving unit, a judging unit, a first sending unit and a second sending unit.

The receiving unit is configured to receive a bandwidth request sent by a subordinate network entity and send to the judging unit.

The judging unit is configured to parse the received bandwidth request and judge whether the RS has available bandwidth or not: if the RS has available bandwidth, send the received bandwidth request to the first sending unit; if the RS has no available bandwidth, send the received bandwidth request to the second sending unit.

The first sending unit uses the available bandwidth to send bandwidth request to the superordinate network entity.

The second sending unit is configured to send the ranging code to the superordinate network entity.

According to one embodiment of the present invention, after receiving the message sent by the subordinate network entity, the relay station RS firstly judges whether it has the available bandwidth or not; if RS has available bandwidth, directly uses the available bandwidth to send bandwidth request instead of sending CDMA ranging code, and then obtain uplink bandwidth allocated by the base station to send bandwidth requests which is from its subordinate network entity. The message exchange is reduced in the flow of sending the bandwidth request. Therefore, the solution provided according to an embodiment of the present invention may speed up the bandwidth request.

DETAILED DESCRIPTION

In the process of centralized scheduling, some RS in the relay link may obtain part of available bandwidth through the bandwidth stealing way. Specifically, RS near the MR_BS is more likely to have bandwidth resources. In one embodiment of the present invention, RS in the relay link directly uses the available bandwidth to send bandwidth requests to MR_BS, so as to greatly accelerate the procedure for MS to send bandwidth requests.

In the relay system based on centralized scheduling, to transfer the bandwidth request from MS, if RS in any hop (larger than or equal to 2) in the relay link has available bandwidth, according to the present bandwidth resource, it uses the available bandwidth to send bandwidth request; if it has no available bandwidth, it uses CDMA ranging codes to request bandwidth, so as to accelerate the bandwidth request procedure.

After receiving the bandwidth request from a subordinate network entity, RS judges whether it has available bandwidth or not. If RS has available bandwidth, the RS uses available bandwidth to send bandwidth requests to superordinate network entity. Otherwise, the RS request bandwidth from superordinate network entity by using CDMA ranging codes.

In one embodiment of the present invention, the subordinate network entity may be an MS or a subordinate RS, while the superordinate network entity may be an MR_BS or a superordinate RS.

The following elaborates main principles, detailed description, and corresponding beneficial effects of an embodiment of the present invention by using each drawing.

Figure 2:
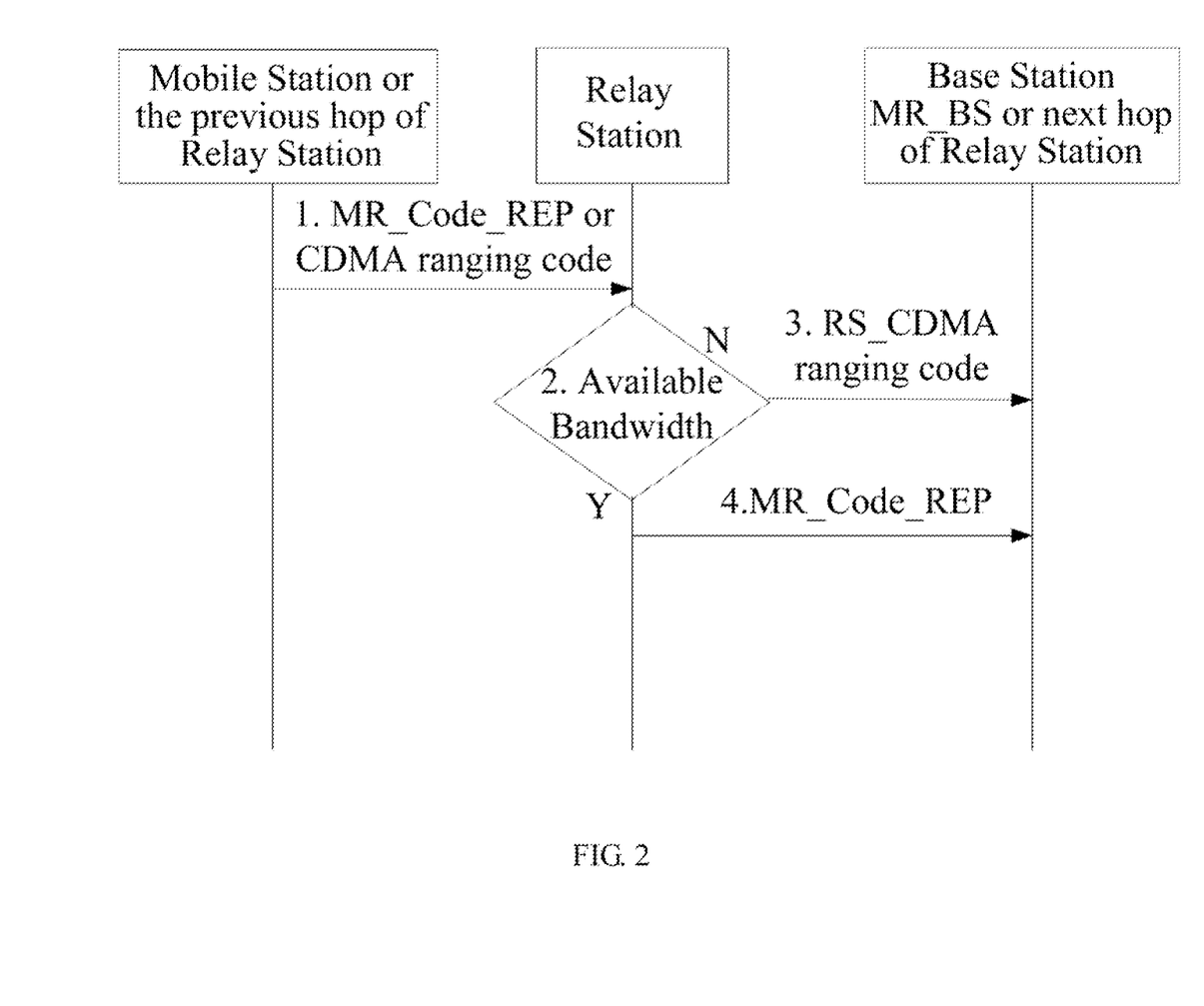
FIG. 2 shows a schematic flowchart view of the method according to one embodiment of the present invention.

FIG. 2 shows the schematic flowchart view of the method according to one embodiment of the present invention. The method includes:

Step 1: In the multi-hop relay system, MS sends the MS_CDMA ranging code to its severing RS, or a subordinate RS sends the RS_CDMA ranging code to RS. The subordinate RS may use its available bandwidth to send bandwidth requests to the RS.

Specially, in this embodiment and following embodiments, MS_CDMA ranging code is noted as CDMA ranging code sent by MS, the CDMA ranging code is in the subset of CDMA ranging codes allocated by MR_BS for MS. RS_CDMA ranging code is noted as the CDMA ranging code sent by RS, and the CDMA ranging code is in the subset of CDMA ranging codes allocated by MR_BS for RS.

The MR-BS shall assign unique RS CDMA ranging code subset to each RS in its MR-cell in order to reduce the overhead and latency of various ranging processes in relay networks. One parts of these RS CDMA ranging codes may be reserved for the purpose of informing the MR-BS that an RS is requesting to forward a bandwidth request header to the MR-BS. Other parts of RS CDMA ranging codes may be reserved for the purpose of informing the MR-BS that the RS is requesting to forward a bandwidth request header to the MR-BS.

Specially, the RS receives the bandwidth request message sent by the subordinate RS is an MR_Code_REP message, or the RS receives the CDMA ranging code from its subordinate network entity successfully, it sends an MR_Code_REP message to inform its superordinate network entity that the CDMA ranging code from its subordinate network entity is received successfully. The format of MR_CODE_REP is shown in following table:

| Grammar | Size | Remark |
| --- | --- | --- |
| MR_Code_REP_Message_Format(){ | | |
| Management Message Type=69 | 8 bits | To be arranged |
| MR_Code_REP TLVs | Variable | |
| } | | |

In the table above, the MR_Code_REP_Message_Format is the format of a multi-hop relay code report, the Management Message Type is the type of management message, and the MR_CODE_REP TLV (Multiple Relay Code Report TypeLegthValue) is the type, length, and value of a multi-hop relay code report. The length of MR_CODE-REP TLV is 4 bytes. The bits from 31 to 22 indicate the OFDM time symbol for sending the ranging code; the bits from 21 to 16 indicate the OFDMA sub-channel for sending the ranging code; the bits from 15 to 18 indicate the ranging code number sent by MS or RS; and the bits from 7 to 0 indicate the frame number index of an OFDMA frame in which MS sends the CDMA ranging code.

Step 2: After receiving the CDMA ranging code or MR_CODE_REP sent by the subordinate network entity (MS or subordinate RS), the RS judges whether it has available bandwidth. If it has available bandwidth, the process proceeds step 4; if it has not available bandwidth, the process proceeds step 3.

Step 3: If the RS has not available bandwidth and the RS receives the CDMA ranging code, RS stores the received CDMA ranging code information, sends a CDMA ranging code, which is in CDMA ranging code subset allocated by MR_BS for RS, to MR_BS, and requests for the uplink bandwidth to send bandwidth request from its subordinate network entity. The CDMA ranging code sent by RS is identified as RS_CDMA ranging code.

If the MR_Code_REP message is received, RS reads the content of the received MR_Code_REP message and stores the content (e.g. related CDMA code information). RS sends the corresponding RS_CDMA ranging code to the superordinate network entity (MR_BS or superordinate RS).

Step 4: If the RS has available bandwidth, and RS receives the CDMA ranging code, RS directly sends the MR_Code_REP message to the superordinate network entity (MR_BS or superordinate RS). The MR_Code_REP message includes the CDMA ranging code information sent by the subordinate RS or MS.

If the MR_Code_REP message is received, RS reads the content of the MR_Code_REP message and correspondingly generates a new MR_Code_REP message to the superordinate network entity (superordinate RS or MR_BS). The content of the MR_Code_REP message generated by RS is similar to the MR_Code_REP message of the subordinate network entity except the Hashed Message Authentication Code (HMAC) and the Cipher-based Message Authentication Code (CMAC).

Accordingly, the following specific embodiments are further provided in the present invention to detail the flow of bandwidth request.

Embodiment 1

Figure 3A:
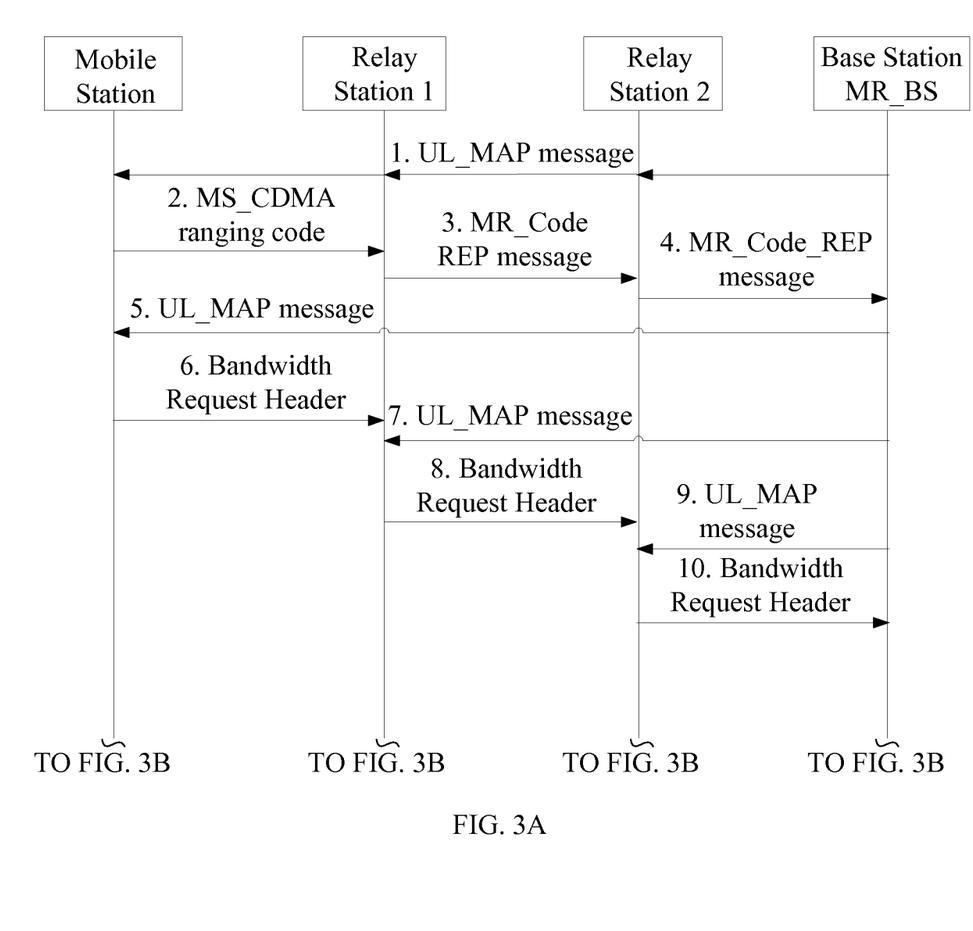
FIGS. 3A-3B shows a schematic flowchart view of bandwidth request and service sending in relay system according to one embodiment of the present invention.
Figure 3B:
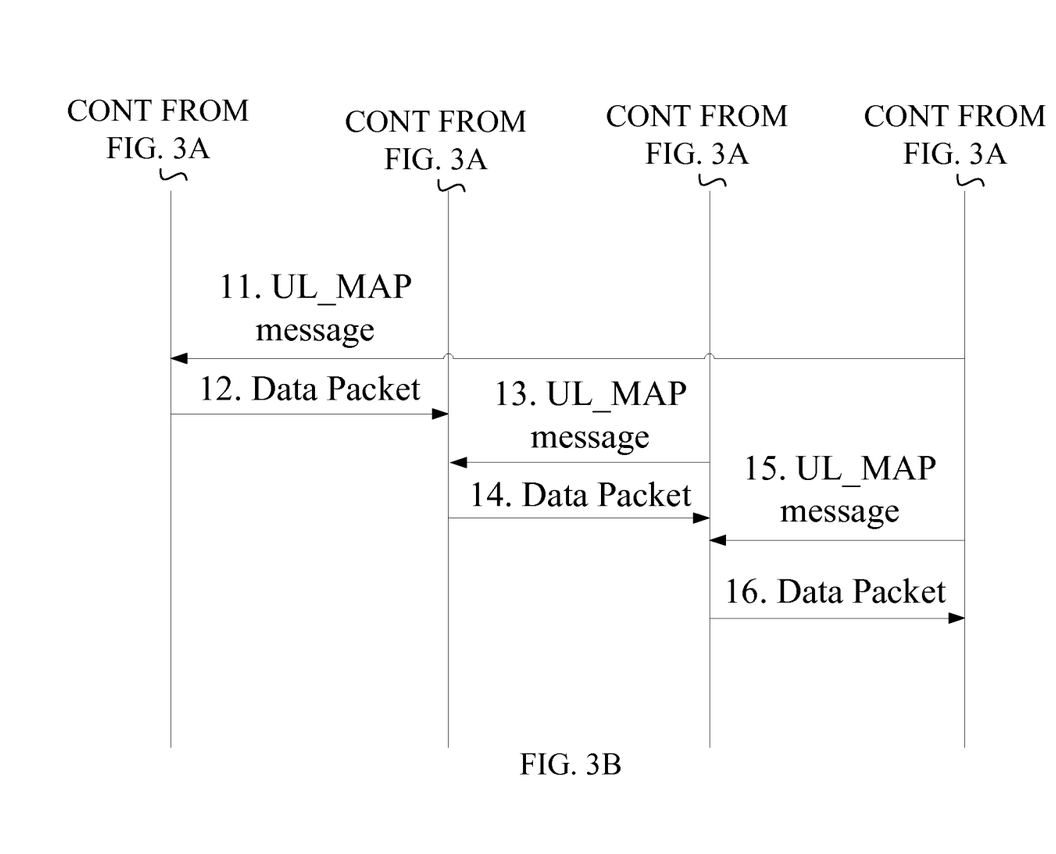

FIG. 3 shows a schematic flowchart view of bandwidth requests and service sending in the relay system according to one embodiment of the present invention.

The system according to this embodiment of the present invention is a 3-hops relay system. RS1 and RS2 have available bandwidth for sending bandwidth request messages, namely, using the available bandwidth to send the MR_Code_REP message.

Step 1: MR_BS broadcasts the UL_MAP message to MS, RS1, and RS2. FIG. 3 shows that MS receives the UL_MAP message sent by MR_BS through broadcast. Actually, MS may receive the UL_MAP message directly from MR_BS, or receive the UL_MAP message forwarded by relay stations. Similarly, the UL_MAP message received by RS1 may be directly from MR_BS, or be forwarded by RS2.

Step 2: MS sends CDMA ranging codes to RS1 to request the uplink bandwidth; and the CDMA ranging code sent by MS is identified as an MS_CDMA ranging code.

Step 3: RS1 judges that it has available bandwidth, it sends the MR_Code_REP message to RS2 according to the received MS_CDMA ranging code information; and the MR_Code_REP message includes the MS_CDMA ranging code information.

Step 4: After receiving MR_Code_REP message, RS2 judges that whether it has available bandwidth or not; if RS2 has available bandwidth, RS2 reads the content of the MR_Code_REP message and generates a new MR_Code_REP message to send to MR_BS. The content of the new MR_Code_REP message is basically the same with that of the MR_Code_REP message of the previous hop.

Step 5: After receiving MR_Code_REP message, MR_BS reads the content of the message and obtains the MS_CDMA ranging code information. MR_BS allocates the corresponding uplink bandwidth to MS. Specifically, MR_BS broadcasts the UL_MAP message which contains the information about allocating the uplink bandwidth to MS. FIG. 3 shows that MS directly receives the UL_MAP message sent by MR_BS through broadcast. Actually, MS may receive the UL_MAP message forwarded by relay stations.

Step 6: MS uses the uplink bandwidth allocated by MR_BS to send the bandwidth request header to RS1.

Step 7: MR_BS broadcasts the UL_MAP message which contains the information about allocating uplink bandwidth to RS1 at appropriate time according to the processing time of RS1. FIG. 3 shows that RS1 directly receives the UL_MAP message sent by MR_BS through broadcast. Actually, RS1 may receive the UL_MAP message forwarded by RS2.

Step 8: RS1 uses the uplink bandwidth allocated by UL_MAP message to send the bandwidth request header to RS2.

Step 9: MR_BS broadcasts the UL_MAP message which contains the information about allocating the uplink bandwidth to RS2 at appropriate time according to the processing time of RS2.

Step 10: RS2 uses the uplink bandwidth allocated by the UL_MAP message to send the bandwidth request header to MR_BS.

Step 11: MR_BS broadcasts the UL_MAP message which contains the information about allocating the uplink bandwidth to MS according to the content of the received bandwidth request header. FIG. 3 shows that MS directly receives the UL_MAP message sent by MR_BS through broadcast. Actually, MS may receive the UL_MAP message forwarded by relay stations.

Step 12: MS uses the uplink bandwidth allocated by MR_BS to send data packets to RS1.

Step 13: MR_BS broadcasts the UL_MAP message which contains the information about allocating uplink bandwidth to RS1 at appropriate time according to the processing time of RS1. FIG. 3 shows that RS1 directly receives the UL_MAP message sent by MR_BS through broadcast. Actually, RS1 may receive the UL_MAP message forwarded by RS2.

Step 14: RS1 uses the uplink bandwidth allocated by UL_MAP message to send data packets to RS2.

Step 15: MR_BS broadcasts the UL_MAP message which contains the information about allocating the uplink bandwidth to RS2 at appropriate time according to the processing time of RS2.

Step 16: RS2 uses the uplink bandwidth allocated by the UL_MAP message to send data packets to MR_BS.

In this embodiment, both RS1 and RS2 have available bandwidth. Compared with conventional technologies, this embodiment eliminates the needs for sending CDMA ranging codes to MR_BS by RS1 and RS2, and the signaling exchange of the corresponding UL_MAP message by MR_BS through broadcast. Therefore, the bandwidth application time delay is reduced, compared with the bandwidth request procedure in the conventional technologies.

Embodiment 2

Figure 4A:
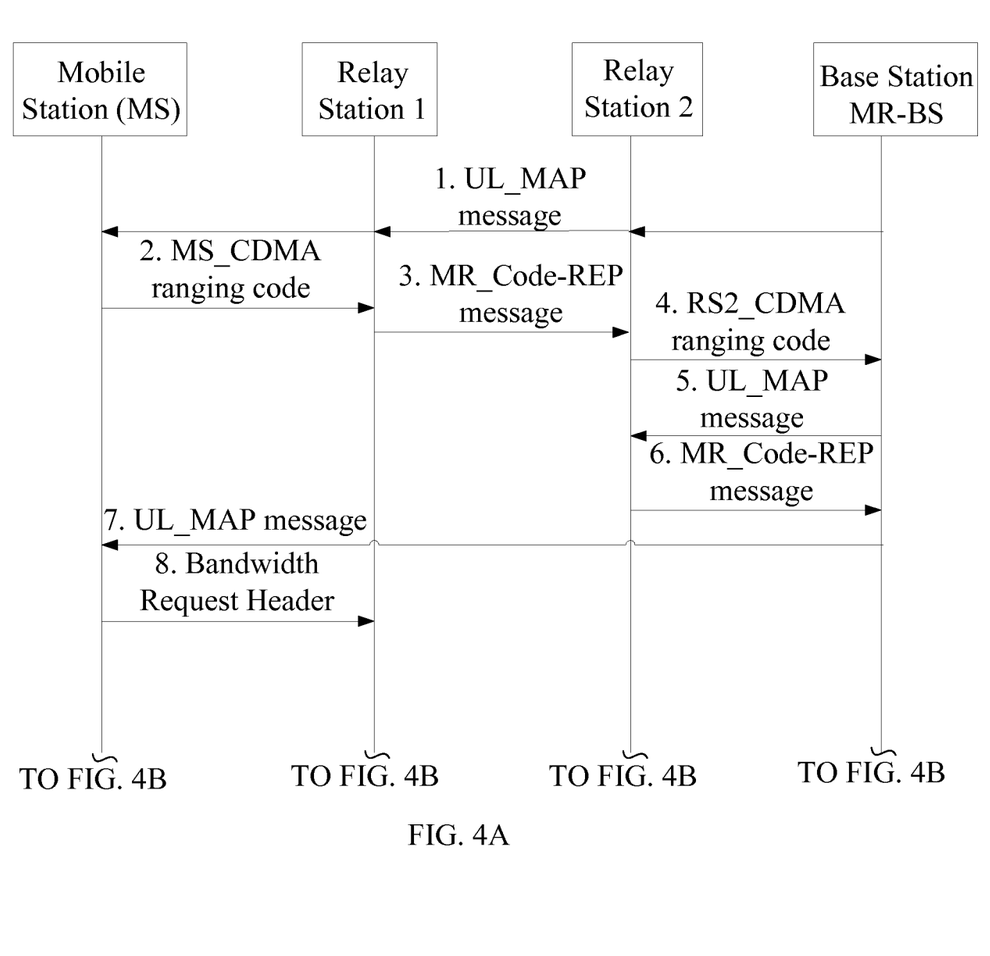
FIGS. 4A-4B shows a schematic flowchart view of bandwidth request and service sending in relay system provided according to another embodiment of the present invention.
Figure 4B:
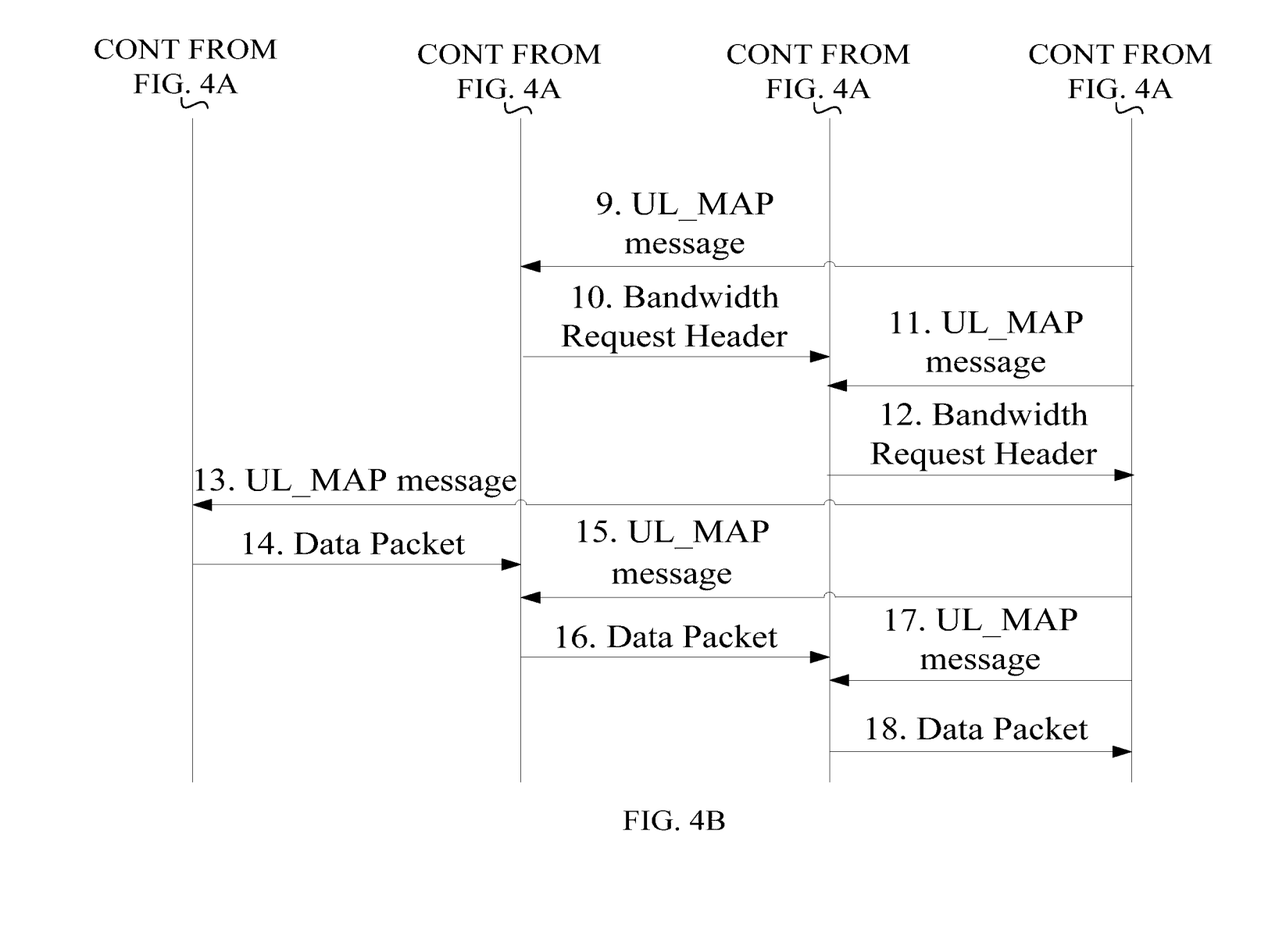

FIG. 4 shows a schematic flowchart view of bandwidth request and service sending in relay system according to another embodiment of the present invention.

The system according to this embodiment of the present invention is a 3-hop relay system. RS1 has available bandwidth for sending bandwidth request messages, while RS2 has no available bandwidth for sending bandwidth request messages.

Step 1: MR_BS broadcasts the UL_MAP message to MS, RS1, and RS2. FIG. 4 shows that MS receives the UL_MAP message sent by MR_BS through broadcast. Actually, MS may receive the UL_MAP message directly from MR_BS, or receive the UL_MAP message forwarded by relay stations. Similarly, the UL_MAP message received by RS1 may be directly from MR_BS, or be forwarded by RS2.

Step 2: MS sends a CDMA ranging code to RS1 to request uplink bandwidth, and the CDMA ranging code sent by MS is identified as MS_CDMA ranging code.

Step 3: RS1 judges that it has available bandwidth, it sends the MR_Code_REP message to RS2 according to the received MS_CDMA ranging code information; and the MR_Code_REP message includes the MS_CDMA ranging code information.

Step 4: After receiving the MR_Code_REP message, RS2 judges that it has no available bandwidth, reads the content of MR_Code_REP message and stores it, sends the CDMA ranging code, which is in the subset of CDMA ranging codes allocated by MR_BS for RS2 itself, to MR_BS, and requests for the uplink bandwidth by sending a bandwidth request. The CDMA ranging code sent by RS2 is identified as an RS2_CDMA ranging code.

Step 5: After receiving RS2_CDMA ranging code, MR_BS broadcasts the UL_MAP message which contains the information about allocating uplink bandwidth to RS2.

Step 6: RS2 sends the MR_Code_REP message to MR_BS through the uplink bandwidth allocated by MR_BS. The MR_Code_REP message carries the content from the MR_Code_REP message sent by RS1, namely, the MS_CDMA ranging code information.

Step 7: After receiving the MR_Code_REP message, MR_BS reads the content of the message, and obtains the MS_CDMA ranging code information. MR_BS allocates the corresponding uplink bandwidth to MS. Specifically, MR_BS broadcasts the UL_MAP message which contains the information about allocating the uplink bandwidth to MS. FIG. 4 shows that MS directly receives the UL_MAP message sent by MR_BS through broadcast. Actually, MS may receive the UL_MAP message forwarded by relay stations.

Step 8: MS uses the uplink bandwidth allocated by MR_BS to send a bandwidth request header to RS1.

Step 9: MR_BS broadcasts the UL_MAP message which contains the information about allocating the uplink bandwidth to RS1 at appropriate time according to the processing time of RS1. FIG. 4 shows that RS1 directly receives the UL_MAP message sent by MR_BS through broadcast. Actually, RS1 may receive the UL_MAP message forwarded by RS2.

Step 10: RS1 uses the uplink bandwidth allocated by the UL_MAP message to send the bandwidth request header to RS2.

Step 11: MR_BS broadcasts the UL_MAP message which contains the information about allocating the uplink bandwidth to RS2 according to the processing time of RS2.

Step 12: RS2 uses the uplink bandwidth allocated by the UL_MAP message to send the bandwidth request header to MR_BS.

Step 13: MR_BS broadcasts the UL_MAP message which contains the information about allocating the uplink bandwidth to MS according to the received bandwidth request header. FIG. 4 shows that MS directly receives the UL_MAP message sent by MR_BS through broadcast. Actually, MS may receive the UL_MAP message forwarded by relay stations.

Step 14: MS uses the uplink bandwidth allocated by MR_BS to send data packets to RS1.

Step 15: MR_BS broadcasts the UL_MAP message which contains the information about allocating the uplink bandwidth to RS1 according to the processing time of RS1. FIG. 4 shows that RS1 directly receives the UL_MAP message sent by MR_BS through broadcast. Actually, RS1 may receive the UL_MAP message forwarded by RS2.

Step 16: RS1 uses the uplink bandwidth allocated by UL_MAP message to send data packets to RS2.

Step 17: MR_BS broadcasts the UL_MAP message which contains the information about allocating the uplink bandwidth to RS2 according to the processing time of RS2.

Step 18: RS2 uses the uplink bandwidth allocated by UL_MAP message to send data packets to MR_BS.

In this embodiment, RS1 has available bandwidth. Compared with conventional technologies, this embodiment eliminates the needs for sending CDMA ranging code to MR_BS by RS1, and the signaling exchange of corresponding UL_MAP message by MR_BS through broadcast. Therefore, the bandwidth application latency is reduced, compared with the bandwidth request procedure in the conventional technologies.

Embodiment 3

Figure 5A:
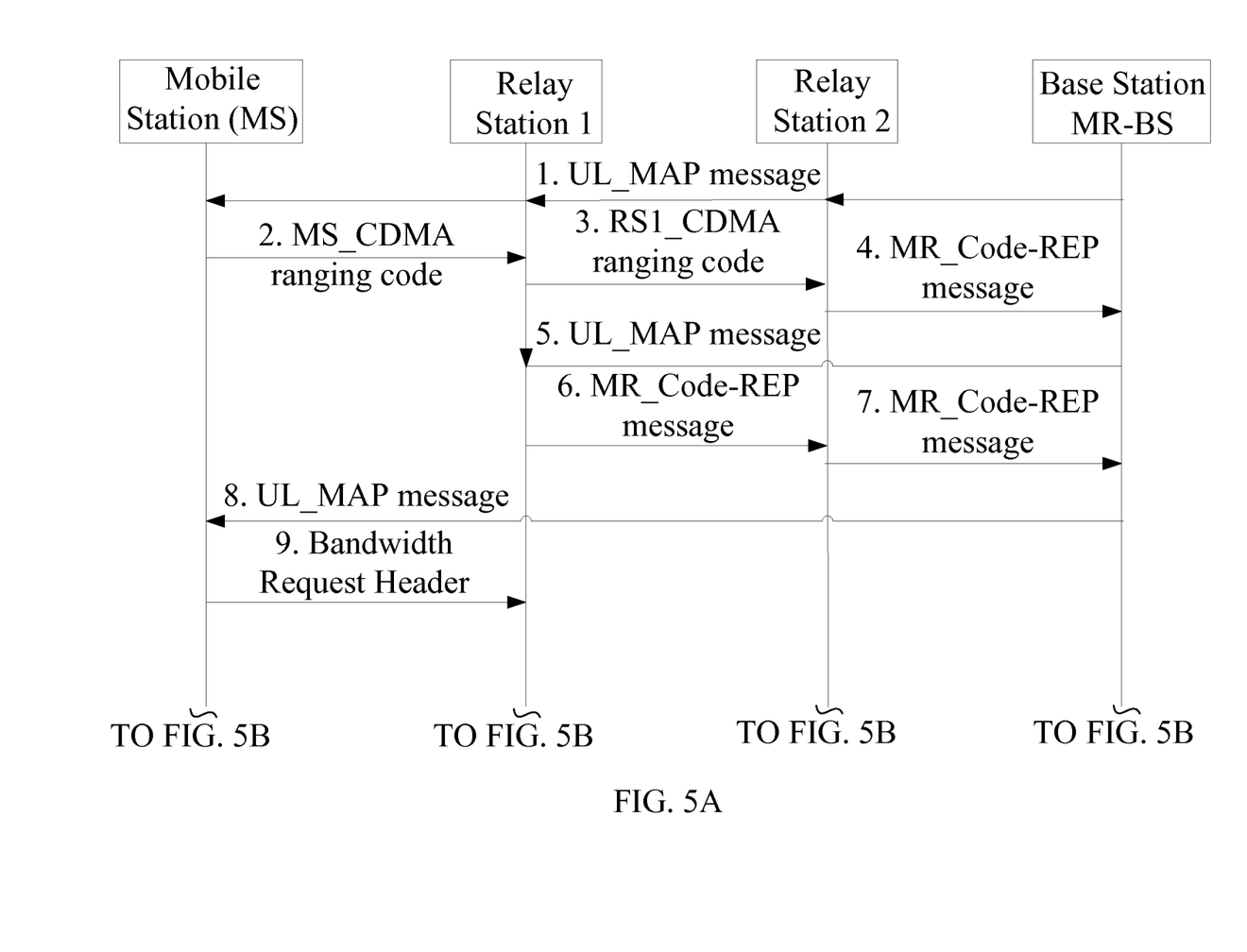
FIGS. 5A-5B shows a schematic flowchart view of bandwidth request and service sending in relay system according to another embodiment of the present invention.
Figure 5B:
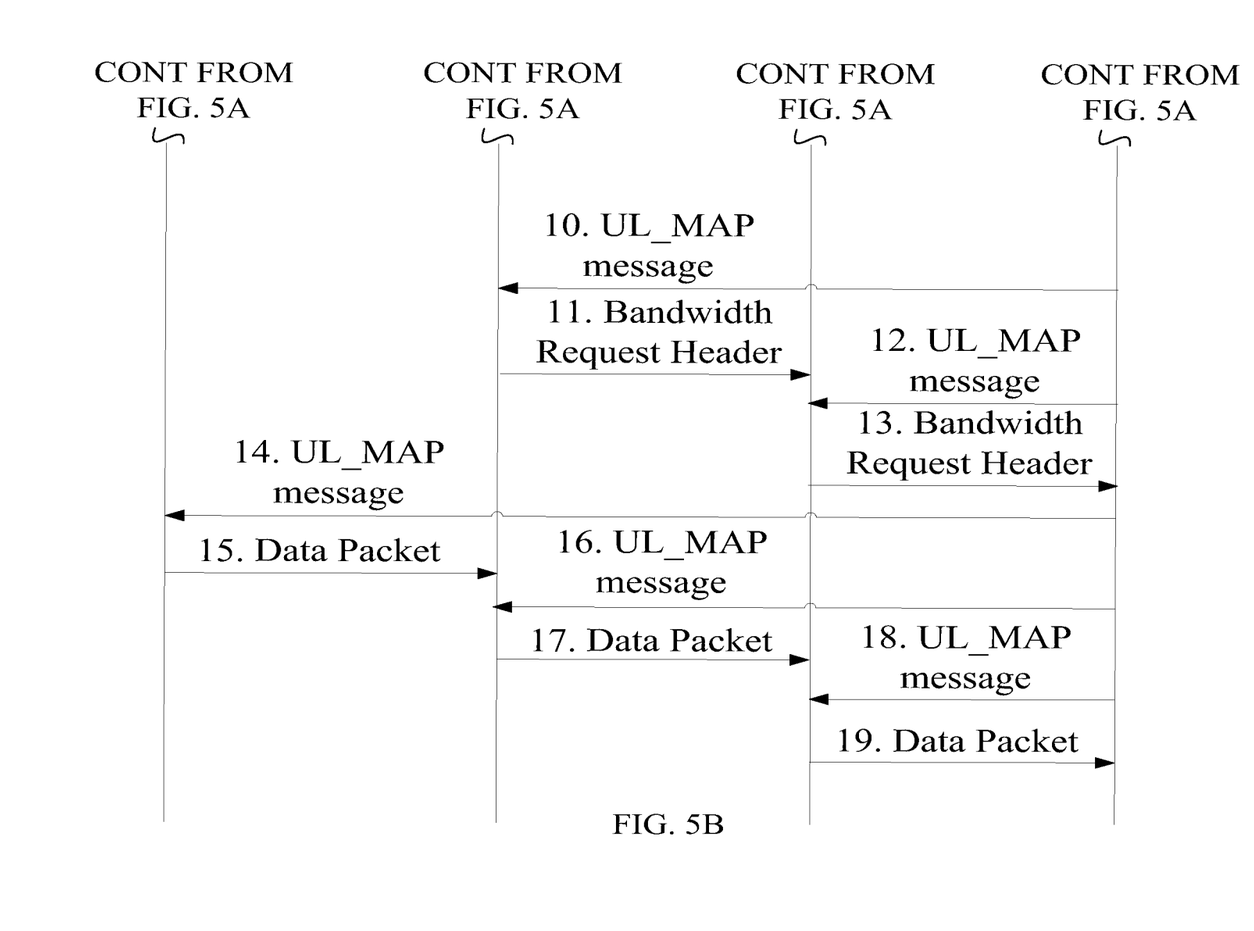

FIG. 5 shows a schematic flowchart view of bandwidth request and service sending in relay system according to yet another embodiment of the present invention.

The system according to this embodiment of the present invention is a 3-hop relay system. RS1 has no available bandwidth for sending bandwidth request message, while RS2 has available bandwidth for sending bandwidth request message, i.e. MR_Code_REP message.

Step 1: MR_BS broadcasts the UL_MAP message to MS, RS1, and RS2. FIG. 5 shows that MS receives the UL_MAP message sent by MR_BS through broadcast. Actually, MS may receive the UL_MAP message directly from MR_BS, or receive the UL_MAP message forwarded by relay stations. Similarly, the UL_MAP message received by RS1 may be directly from MR_BS, or be forwarded by RS2.

Step 2: MS sends a CDMA ranging code to RS1 to request the uplink bandwidth. The CDMA ranging code sent by MS is identified as MS_CDMA ranging code.

Step 3: RS1 judges its has no available bandwidth, it stores the received CDMA ranging code information; sends the CDMA ranging code, which is in the subset of CDMA ranging codes allocated by MR_BS for RS2 itself, to MR_BS; and requests for the uplink bandwidth to send bandwidth requests. The CDMA ranging code sent by RS1 is identified as RS1_CDMA ranging code.

Step 4: After receiving RS1_CDMA ranging code, RS2 judges that it has available bandwidth and sends the MR_Code_REP message to the MR_BS according to the received MS_CDMA ranging code information. The MR_Code_REP message includes the RS1_CDMA ranging code message.

Step 5: After receiving MR_Code_REP message, MR_BS broadcasts the UL_MAP message which contains the information about allocating the uplink bandwidth to RS1 according to the carried RS1_CDMA ranging code information. FIG. 5 shows that RS1 directly receives the UL_MAP message sent by MR_BS through broadcast. Actually, RS1 may receive the UL_MAP message forwarded by RS2.

Step 6: RS1 sends MR_Code_REP message to RS2 via the uplink bandwidth allocated by MR_BS.

Step 7: After receiving the MR_Code_REP message from RS1, RS2 judges whether it has available bandwidth. If it has available bandwidth it sends an MR_Code_REP message to MR_BS. RS2 parses the received MR_Code_REP message from RS1, generates a new MR_Code_REP message, and sends the new MR_Code_REP message to MRBS. The new MR_Code_REP message carries the parsed content of the MR_Code_REP message sent by RS1, namely, carries the MS_CDMA ranging code information.

Step 8: After receiving the MR_Code_REP message, MR_BS reads the content of the message, and obtains the MS_CDMA ranging code information. MR_BS allocates the corresponding uplink bandwidth to MS. Specifically, MR_BS broadcasts the UL_MAP message which contains the information about allocating the uplink bandwidth to MS. FIG. 5 shows that MS directly receives the UL_MAP message sent by MR_BS through broadcast. Actually, MS may receive the UL_MAP message forwarded by relay stations contains the information about allocating Step 9: MS uses the allocated uplink bandwidth to send a bandwidth request header to RS1.

Step 10: MR_BS broadcasts the UL_MAP message which contains the information about allocating the uplink bandwidth to RS1 at appropriate time according to the processing time of RS1. FIG. 5 shows that RS1 directly receives the UL_MAP message sent by MR_BS through broadcast. Actually, RS1 may receive the UL_MAP message forwarded by RS2.

Step 11: RS1 uses the uplink bandwidth allocated by UL_MAP message to send a bandwidth request header to RS2.

Step 12: MR_BS broadcasts the UL_MAP message which contains the information about allocating the uplink bandwidth to RS2 according to the processing time of RS2.

Step 13: RS2 uses the uplink bandwidth allocated by the UL_MAP message to send a bandwidth request header to MR_BS.

Step 14: MR_BS broadcasts the UL_MAP message which contains the information about allocating the uplink bandwidth to MS according to the received bandwidth request header. FIG. 4 shows that MS directly receives the UL_MAP message sent by MR_BS through broadcast. Actually, MS may receive the UL_MAP message forwarded by relay stations.

Step 15: MS uses the uplink bandwidth allocated by MR_BS to send data packets to RS1.

Step 16: MR_BS broadcasts the UL_MAP message which contains the information about allocating the uplink bandwidth to RS1 at appropriate time according to the processing time of RS1. FIG. 4 shows that RS1 directly receives the UL_MAP message sent by MR_BS through broadcast. Actually, RS1 may receive the UL_MAP message forwarded by RS2.

Step 17: RS1 uses the uplink bandwidth allocated in the UL_MAP message to send data packets to RS2.

Step 18: MR_BS broadcasts the UL_MAP message which contains the information about allocating the uplink bandwidth to RS2 according to the processing time of RS2.

Step 19: RS2 uses the uplink bandwidth allocated in the UL_MAP message to send data packets to MR_BS.

In this embodiment, RS2 has available bandwidth. Compared with conventional technologies, this embodiment eliminates the needs for sending CDMA ranging code to MR_BS by RS2, and the signaling exchange of corresponding UL_MAP message by MR_BS through broadcast. Therefore, the bandwidth application latency is reduced, compared with the bandwidth request procedure in the conventional technologies.

Figure 6:
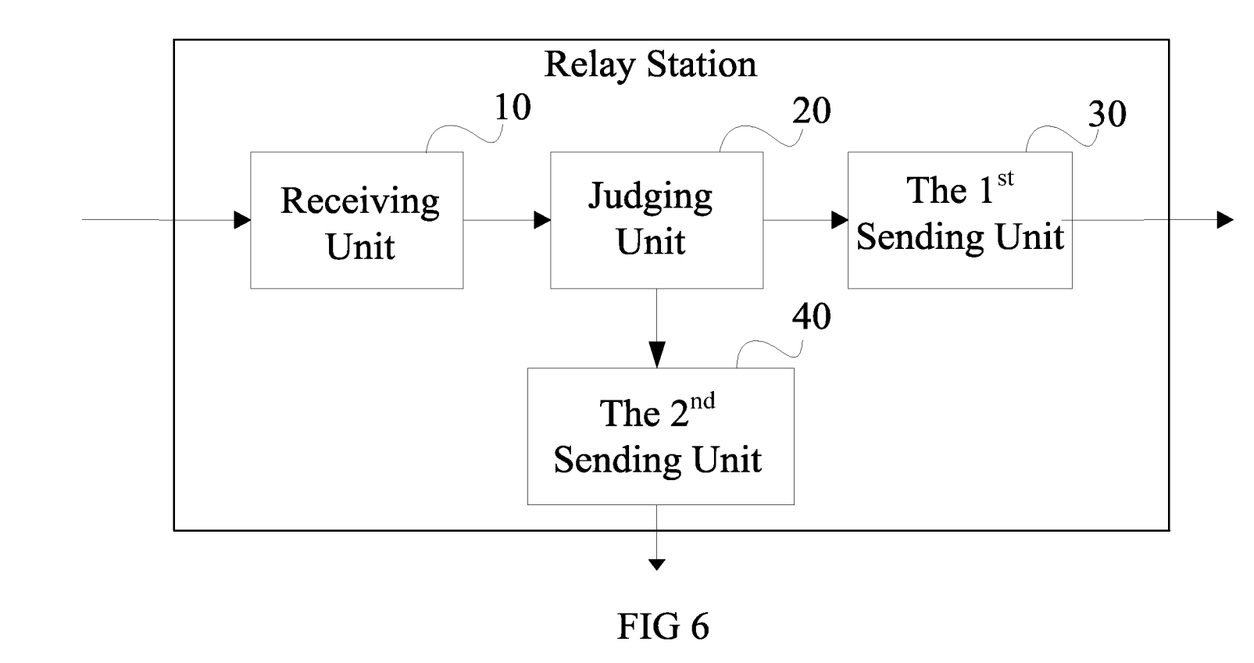
FIG. 6 shows a schematic structural view of the relay station according to one an embodiment of the present invention.

Accordingly, a relay station (RS) for bandwidth request is provided according to an embodiment of the present invention, and the RS includes a receiving unit 10, a judging unit 20, a first sending unit 30 and a second sending unit 40 as shown in FIG. 6.

The receiving unit 10 is configured to receive a bandwidth request sent by a subordinate network entity and send to the judging unit 20.

Specially, subordinate network entity may be an MS or a subordinate RS.

The judging unit 20 is configured to parse the received bandwidth request and judge whether the bandwidth is available in the relay station: if the bandwidth is available, send the received bandwidth request to the first sending unit 30; if the bandwidth is not available, send the received bandwidth request to the second sending unit 40.

The first sending unit 30 is configured to send the bandwidth request to a superordinate network entity based on the available bandwidth.

The second sending unit 40 is configured to send a ranging code to the superordinate network entity.

Specially, superordinate network entity may be an MR_BS or a superordinate RS.

Figure 7:
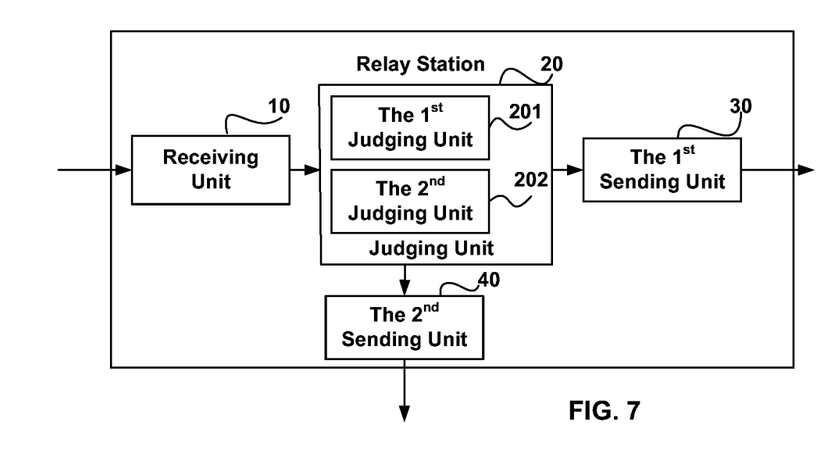
FIG. 7 shows a schematic structural view of relay station according to another embodiment of the present invention.

Preferably, as shown in FIG. 7, the judging unit 20 in RS further includes:

a first judging subunit 201, configured to parse the received bandwidth request from the subordinate network entity based on the available bandwidth; if the relay station has available bandwidth, the received bandwidth request is sent to the first sending unit 30 via the first message; otherwise, the received bandwidth request is sent to the second sending unit 40 via the second message; and a second judging subunit 202, configured to parse the received ranging code sent by the subordinate network entity; if the relay station has available bandwidth, the received ranging code is sent to the first sending unit 30 via the third message; otherwise, the received ranging code is sent to the second sending unit 40 via the forth message.

After receiving the first message, the first sending unit 30 uses the available bandwidth to send a new bandwidth request to the superordinate network entity, and the new bandwidth request includes the content of the bandwidth request sent by the subordinate network entity.

After receiving the third message, the first sending unit 30 uses the available bandwidth to send a new bandwidth request to the superordinate network entity, and the new bandwidth request includes the content of the bandwidth request sent by the subordinate network entity.

After receiving the second or fourth message, the second sending unit 40 sends the ranging code to the superordinate network entity.

As seen from the above description, a bandwidth request method and a relay station RS are provided according to some embodiments of the present invention. After receiving the message sent by the subordinate network entity, RS judges whether it has available bandwidth or not. If RS has available bandwidth, it sends bandwidth request based on the available bandwidth; otherwise, it requests bandwidth from the superordinate network entity by using the CDMA ranging code. The solution provided in embodiments of the present invention may speed up the bandwidth requests.

Based on the description of previous embodiments, it is understandable to those skilled in the art that the present invention may be performed through hardware, or through a software program with a necessary general hardware platform. Based on such understanding, the solution of this invention may be presented by a software program; the software program may be stored in a nonvolatile storage medium (CD-ROM, memory stick, or mobile disk), including instructions to enable a computer (PC, server, or network device) to execute the method in each embodiment of the present invention.

In sum, the preceding embodiments are intended to describe but not confine the present invention. This invention is intended to cover all the modifications, equivalent replacements, and improvements of this invention provided that they fall in the scope of the spirit and principles of this invention.

What is claimed is:

1. A method of managing bandwidth requests at a relay station (RS) in a wireless telecommunications network, wherein the RS comprises first and second sending units, the method comprising:

receiving a first bandwidth request and a ranging code sent by a subordinate network entity;

judging whether the RS has sufficient bandwidth available for accommodating the first bandwidth request sent from the subordinate network entity;

sending the first bandwidth request to the first sending unit via a first message when the RS has sufficient bandwidth available for accommodating the first bandwidth request;

sending the first bandwidth request to the second sending unit via a second message when the RS has insufficient bandwidth available for accommodating the first bandwidth request;

sending the received ranging code to the first sending unit via a third message when the RS has sufficient bandwidth available for accommodating the first bandwidth request;

sending the received ranging code to the second sending unit via a forth message when the RS has insufficient bandwidth available for accommodating the first bandwidth request;

sending by the first sending unit, in response to the first message, a second bandwidth request to a superordinate network entity, wherein the second bandwidth request includes the content of the first bandwidth request;

sending by the first sending unit, in response to the third message, a third bandwidth request to the superordinate network entity, wherein the third bandwidth request includes the content of the ranging code sent by the subordinate network entity; and sending by the second sending unit, in response to the second or fourth message, the ranging code to the superordinate network.

2. The method according to claim 1, further comprising:

when sending the ranging code to the superordinate network, receiving a UL_MAP message from a base station; and sending a new bandwidth request to the superordinate network entity by using an allocated uplink bandwidth in the UL_MAP message.

3. The method according to claim 1, wherein, the subordinate network entity is a mobile station; and the superordinate network entity is a base station.

4. The method according to claim 1 wherein, the subordinate network entity is a subordinate relay station and the superordinate network entity is a superordinate relay station.

5. A relay station (RS), comprising:
a receiving unit configured to receive a first bandwidth request sent by a subordinate network entity and send the first bandwidth request to a judging unit;
the judging unit configured to parse the received first bandwidth request and judge whether the RS has sufficient bandwidth available for accommodating the first bandwidth request, and only send the received first bandwidth request to a first sending unit when the RS has sufficient bandwidth available for accommodating the first bandwidth request sent by from the subordinate network entity;
the first sending unit responsive to the judging unit and configured to send the first bandwidth request to a superordinate network entity;
a first judging subunit, configured to (a) parse the first bandwidth request from the subordinate network entity (b) send the first bandwidth request to the first sending unit via a first message if the relay station has sufficient bandwidth; and (c) send the first bandwidth request to a second sending unit via a second message if the relay station has insufficient bandwidth for accommodating the first bandwidth request; and
a second judging subunit, configured to (a) parse a received ranging code from the subordinate network entity; (b) send the received ranging code to the first sending unit via a third message if the relay station has sufficient bandwidth available for accommodating the first bandwidth request; and (c) send the received ranging code to the second sending unit via a forth message if the relay station has insufficient bandwidth available for accommodating the first bandwidth request;
after receiving the first message, the first sending unit sends a second bandwidth request to the superordinate network entity, where the second bandwidth request includes the content of the first bandwidth request sent by the subordinate network entity;
after receiving the third message, the first sending unit sends a third bandwidth request to the superordinate network entity, where the third bandwidth request includes the content of the ranging code sent by the subordinate network entity; and
after receiving the second or fourth message, the second sending unit sends the ranging code to the superordinate network entity.

6. The relay station of claim 5 further comprising:
a UL_MAP message received from a base station when sending the ranging code to the superordinate network; and
an allocated uplink bandwidth in the UL_MAP message for sending a new bandwidth request to the superordinate network entity.

7. The relay station of claim 5, wherein the subordinate network entity is a mobile station and the superordinate network entity is a base station.

8. The relay station of claim 5, wherein the subordinate network entity is a subordinate relay station and the superordinate network entity is a superordinate relay station.

9. A non-transitory computer readable storage medium, comprising computer program codes which when executed by a computer processor at a relay station (RS) cause the computer processor to execute the steps of:
receiving a first bandwidth request and a ranging code sent by a subordinate network entity;
sending the first bandwidth request to a first sending unit of the RS via a first message when the RS has sufficient bandwidth available for accommodating the first bandwidth request;
sending the first bandwidth request to a second sending unit of the RS via a second message when the RS has insufficient bandwidth available for accommodating the first bandwidth request;
sending the received ranging code to the first sending unit of the RS via a third message when the RS has sufficient bandwidth available for accommodating the first bandwidth request;
sending the received ranging code to the second sending unit via a forth message when the RS has insufficient bandwidth available for accommodating the first bandwidth request;
sending by the first sending unit, in response to the first message, a second bandwidth request to a superordinate network entity, wherein the second bandwidth request includes the content of the first bandwidth request;
sending by the first sending unit, in response to the third message, a third bandwidth request to the superordinate network entity, wherein the third bandwidth request includes the content of the ranging code sent by the subordinate network entity; and
sending by the second sending unit, in response to the second or fourth message, the ranging code to the superordinate network.

10. The non-transitory computer readable storage medium of claim 9, further comprising:
when sending the ranging code to the superordinate network, receiving a UL_MAP message from a base station and sending a new bandwidth request to the superordinate network entity by using an allocated uplink bandwidth in the UL_MAP message.

11. The non-transitory computer readable storage medium of claim 9, wherein, the subordinate network entity is a mobile station and the superordinate network entity is a base station.

12. The non-transitory computer readable storage medium of claim 9 wherein, the subordinate network entity is a subordinate relay station and the superordinate network entity is a superordinate relay station.

* * * * *

UNITED STATES PATENT AND TRADEMARK OFFICE
CERTIFICATE OF CORRECTION

PATENT NO.       : 8,553,608 B2              Page 1 of 1
APPLICATION NO.  : 12/647092
DATED            : October 8, 2013
INVENTOR(S)      : Zhang et al.

It is certified that error appears in the above-identified patent and that said Letters Patent is hereby corrected as shown below:

In the Claims

Column 13, line 40, claim 1, "a forth message" should read -- a fourth message --.

Column 14, line 28, claim 9, "a forth message" should read -- a fourth message --.

Signed and Sealed this
Third Day of December, 2013

Margaret A. Focarino
*Commissioner for Patents of the United States Patent and Trademark Office*